United States Patent [19]

Raabe et al.

[11] Patent Number: 5,437,910
[45] Date of Patent: Aug. 1, 1995

[54] MULTI-PLY FILTER LASMINATE/COMPOSITE FOR MANUFACTURING VACUUM CLEANER FILTER BAGS

[75] Inventors: Ernst Raabe, Raubling-Nicklheim; Albrecht Klimmek, Bruckmühl, both of Germany

[73] Assignee: Steinbeis Gessner GmbH, Bruckmühl, Germany

[21] Appl. No.: 95,751

[22] Filed: Jul. 21, 1993

[51] Int. Cl.6 .................. B01D 39/18; B32B 23/02
[52] U.S. Cl. ...................... 428/194; 428/191; 428/35.2; 428/212; 428/220; 428/236; 428/248; 428/309.9; 428/311.5; 428/317.7; 428/537.5; 210/491; 55/381; 55/382
[58] Field of Search ............... 428/35.2, 537.5, 191, 428/236, 194, 248, 220, 212, 309.9, 311.5, 317.7

[56] References Cited

U.S. PATENT DOCUMENTS 3,559,381 2/1971 Fesco ................... 55/357
3,859,064 1/1975 Cordell ................. 55/368

FOREIGN PATENT DOCUMENTS

0338479B1 10/1989 European Pat. Off. .

Primary Examiner—P. C. Sluby
Attorney, Agent, or Firm—Scully, Scott, Murphy & Presser

[57] ABSTRACT

There is provided a multi-ply filter laminate/composite for manufacturing vacuum cleaner filter bags comprising at least one ply of filter paper and at least one ply of fine fiber web, wherein at least one ply of fine fiber web does not cover the whole width of the ply of filter paper bonded to it and thus there are formed one or two edge strip blanks on at least one ply of filter paper.

13 Claims, 3 Drawing Sheets

MULTI-PLY FILTER LASMINATE/COMPOSITE FOR MANUFACTURING VACUUM CLEANER FILTER BAGS

BACKGROUND OF THE INVENTION

1. Field of the Invention

The invention relates to a multi-ply filter laminate/composite for manufacturing vacuum cleaner filter bags, comprising at least one ply of filter paper and at least one ply of fine fibered web.

2. Discussion of the Prior Art

To improve the filtering properties, a large proportion of the filter bags manufactured presently are double-walled with a filter paper outer ply and a highly porous web inner ply. The latter is in most cases a cellulose version, which in certain cases can also be admixed with synthetic fibers. A particular embodiment of the double-walled vacuum cleaner filter bag contains a filter paper outer ply and a melt-blown fine fibered web as the inner ply in order that extremely high values of filtering efficiency may be obtained (DE-38 12 849 C2, EP-0 338 479 BP). To produce the bag, the bagmaking machine is supplied with the paper and the melt-blown web from separate rolls. The paper (1) and web (2) are pulled into the bagmaking machine with their edges offset in order—as depicted in FIGS. 1a and 1b that paper-to-paper bonding (3) and web-to-web bonding (4) may be ensured in the longitudinal seam region.

If this edge offset were not used, a melt,blown fiber web layer would come to lie between the plies of paper to be bonded together and would—since the web is made of plastic-act as a separating layer and make it very difficult, if not impossible, to achieve adequate longitudinal seam bonding. Melt-blown webs can in principle be made of thermoplastics, preferably polyolefins, polyamides, polyesters, polycarbonate and copolymers thereof. Melt-blown webs, provided they are of the appropriate fiber fineness between 2 and 10 $\mu$m in diameter, are excellent filter materials, but they have only limited mechanical properties in strength. Owing to the low strength values, the melt-blown web, which in processing is pulled into the bagmaking machine from a separate roll, has a lower limit as regards the weight per unit area. Thus, the weights employed in known embodiments are usually 15–35 g/m². If the weight is below 15 g/m² it is admittedly possible to exert an influence over the strength formation (bursting pressure, breaking resistance) in the construction of the melt-blown web, but the porosity of the material is very adversely affected, so that use as a filter material is ruled out. For this reason the melt-blown webs used today for this purpose represent a compromise between contradictory, product features, namely filtering and mechanical properties, so that optimum capabilities in filtering properties are very difficult to achieve.

However, if prior to processing on the known bagmaking machines this melt-blown material is combined with the contemplated filter paper outer ply to form a laminate/composite, the mechanical properties of the melt-blown web no longer have to meet any strength requirements, since they are met by the filter paper. The construction of the melt-blown web can for this reason be fully focused on the optimization of the filtering properties, so that even highly porous, open-structured filter webs can be employed. The weight per unit area is limited at the lower end merely by the stipulated filter efficiency and the storage capacity of the material; the strength of the material in terms of the bursting pressure or the breaking resistance does not play a part in this form during processing. The weight per unit area can therefore be found to be far below 10 g/m².

However, with the applied melt-blown layer covering all of the paper, the disadvantage of these embodiments in bag manufacture is that, in the operation of bag longitudinal seam bonding (3'), a melt-blown layer (2') now comes to lie between the paper plies (1'), which after all have to be firmly bonded together (see FIGS. 2a and 2b). This melt-blown layer (2') between the paper plies (1') prevents sufficiently strong longitudinal seam bonding (3') using conventional types of adhesive. Even if other adhesive bonding techniques that are not customary in this industry are used, satisfactory adhesion between the paper plies (1') is not always achievable.

SUMMARY OF THE INVENTION

According to the invention, this problem is solved by a multi-ply filter laminate/composite comprising at least one ply of filter paper and at least one ply of fine fibered web, wherein the at least one ply of fine fibered web does not cover the whole width of a ply of filter paper bonded to it and thus there are formed one or two edge strip blanks on at least one ply of filter paper. The result is, as depicted in FIGS. 3a and 3b, that, when the tube is formed in the bagmaking machine, paper (1") comes to lie on paper (1") and can be glued together via a longitudinal seam bond (3") without interposition of a ply of fine fibered web (2") in the region being glued.

DETAILED DESCRIPTION

Figure 1A:
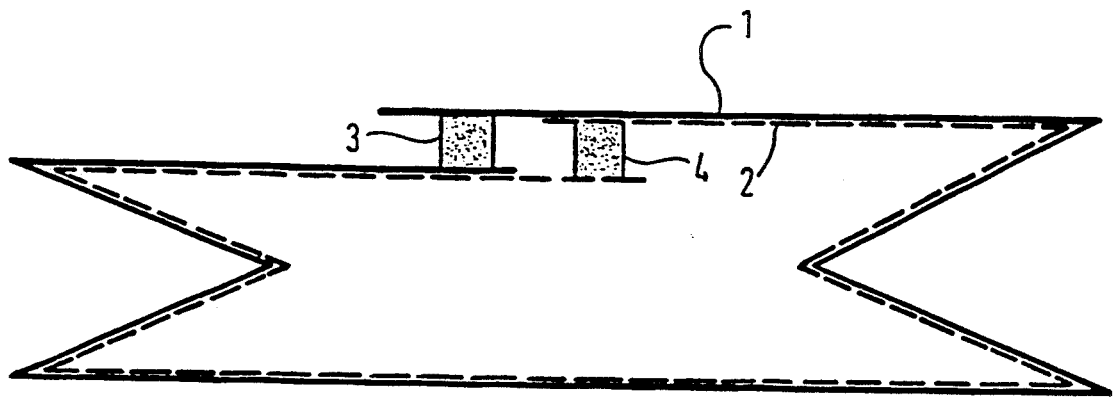
Figure 1B:
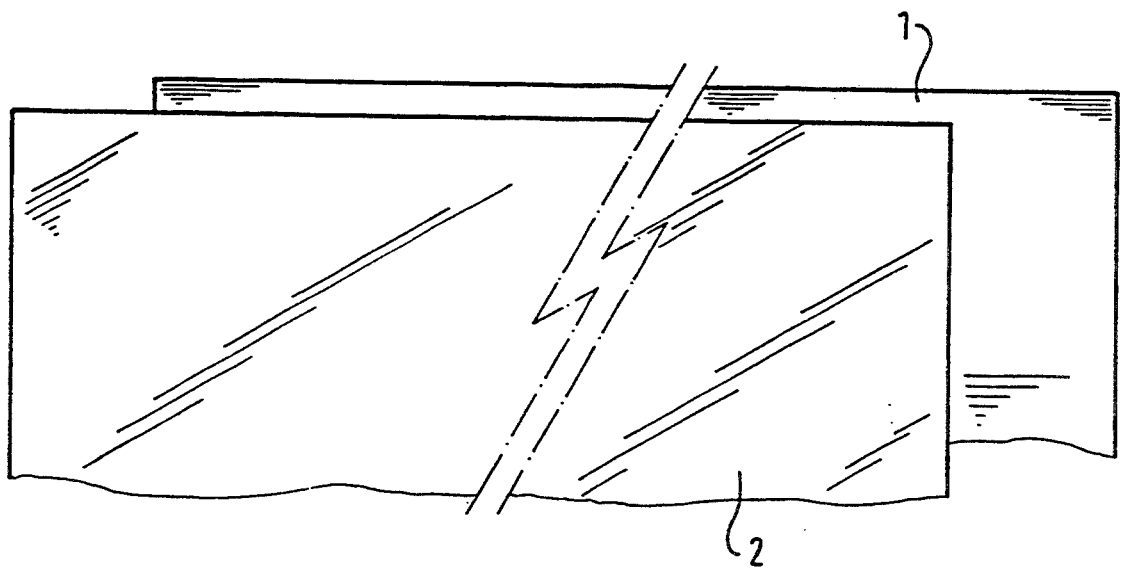
Figure 2A:
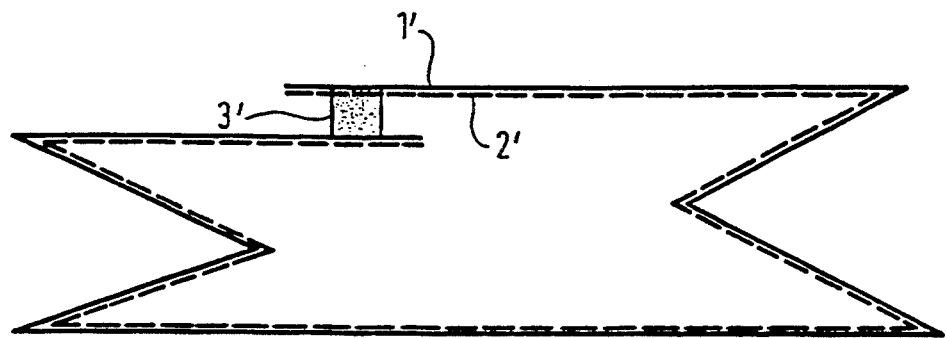
Figure 2B:
Figure 3A:
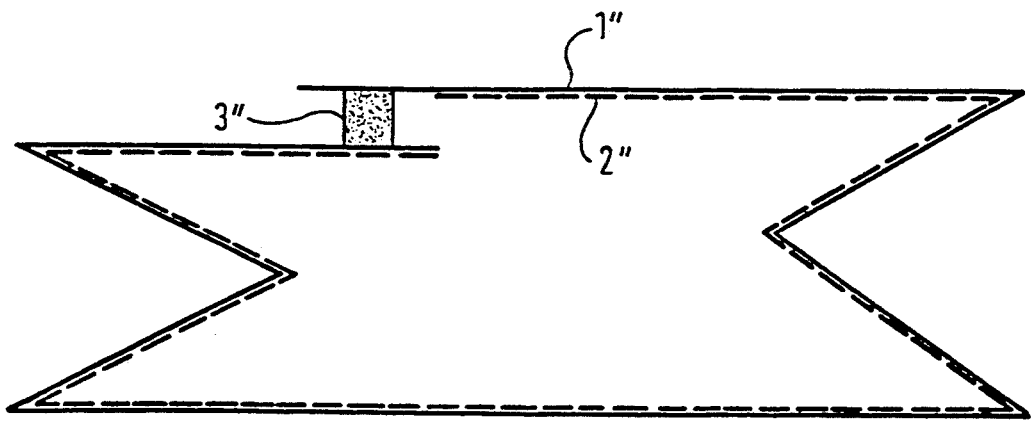
Figure 3B:
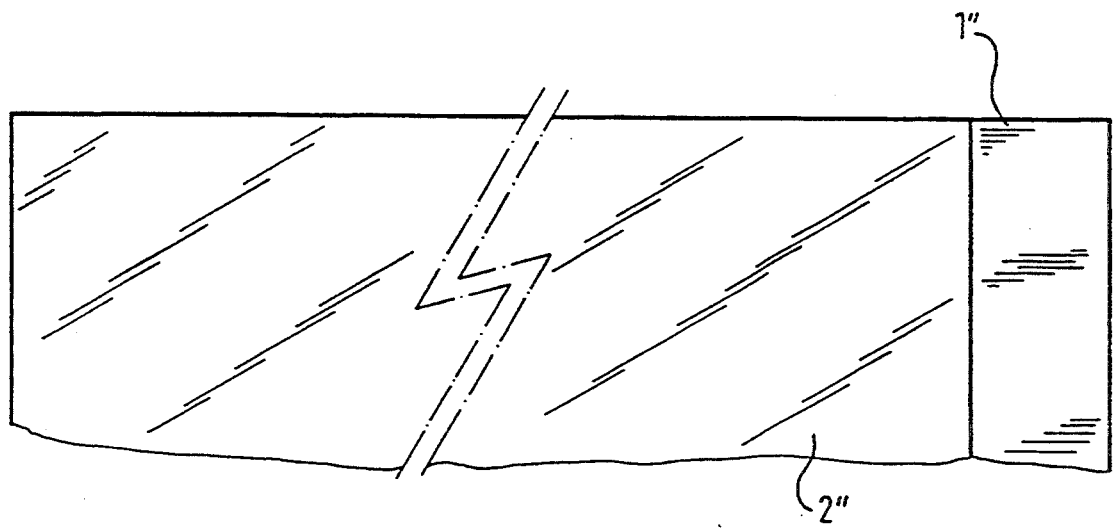

The edge of the ply of fine fibered web on the edge strip blank side can be constructed either as a cut edge or else can be employed in the laminate/composite as an edge that tapers off, as produced for example when the fine fibered web is directly produced and laid down on the ply of filter paper. In any case care must be taken to ensure that the filaments of the fine fibered web do not come to lie between the plies of paper in the region of the longitudinal seam bond of the bag being made and do not act as a separating layer there. This makes it possible to use the customary types of glue and also ensures satisfactory formation of the glued seam.

If the lining web is presented to the bagmaking machine from a roll in a fine fibered form as a laminate/composite with the paper, the production conditions can be optimized to the mechanical processing properties of the paper, so that significantly higher productivities are obtainable here than in the case of a separate feeding of the fine fibered web and of the paper from separate rolls. Moreover, the additional application of glue to the fine fibered web for tube formation is no longer necessary.

For technological processing reasons the filter laminate/composite of the invention is preferably constructed as a continuous length of material.

The edge strip blank can as required amount to 5–50 mm, depending on the particular bag design, on the bagmaking machine used and on the gluing technologies used. The variable nature of the width of the edge blank ensures that the lining web edge can be located exactly positioned proximate the longitudinal seam bonding region. This ensures that not withstanding the edge strip blank the bag enables double-walled filtration all over. In an advantageous embodiment, only one edge strip blank is provided with at least one ply of filter paper, this edge strip blank being positioned on the left-hand or right-hand side of the material, viewed in the processing direction, depending on the processing requirements of the bagmaking machine.

Bonding between the at least one ply of filter paper and the at least one ply of fine fibered web has to be such as to ensure, on the one hand, adequate adhesion between the plies in order that delamination during processing may be prevented. On the other hand, the bonding technology chosen must not impair the available filtering area to any significant extent, if at all. It is therefore necessary for the adhesive connection between the plies to be such that only a minor partial pore closure is encountered and hence the necessary air stream can flow through the vacuum cleaner bag. In a preferred embodiment of the filter laminate/composite of the invention, two or more plies are bonded together by adhesive agents, suitable adhesion mediators being in particular dispersion glues, hot melt adhesives and adhesives in powder form. A further way of bonding the plies together is the application of ultrasonic welding or of hot calendering. Regardless as to whether adhesives are used or whether ultrasonic welding or hot calendering are employed, care must be taken to ensure that the bonding points between the plies are applied in shape and frequency in a regular or random design in such a way as to ensure that the bonding between the plies is uniform over the area and the flow conditions for the air as the dust transporter are not impaired. The bonding between the plies is preferably in dot, grid or strip form.

In a particular embodiment, the two end-edges of the at least one ply of fine fibered web can be bonded airtightly to the ply underneath (for example a ply of filter paper) in the form of a continuous line or strip. This can be of advantage with those types of bag where particular turbulence is likely on the basis of the power rating of the vacuum cleaner and the air flow control in the bag and air could enter between individual plies, in particular between filter paper and fine fiber web plies, via the edge zones, which must be prevented.

To manufacture the laminate/composite described, it is possible to use any filter paper known for fabricating vacuum cleaner bags. The filter paper used preferably has a weight per unit area of 30–80 g/m' (ISO 536) and an air permeability of 80–600 l/m$^2$.s under a vacuum of 200 Pa (DIN 53887). Since the filter paper has to meet the mechanical strength requirements of the laminate/composite material, the breaking load values in the longitudinal direction are preferably between 20 and 80 N (15 mm strip width) and in the transverse direction between 15 and 60 N (15 mm strip width (DIN 53112)). The bursting pressure of the filter paper is preferably within the range between 80 kPa and 300 kPa, (DIN 53141). The weight per unit area of the fine fibered web is preferably 3–30 g/m$^2$ (ISO 536), the range 10–15 g/m$^2$ being particularly preferred. The air permeability of the fine fibered web is preferably within the range 100–2000 l/m$^2$.s under a vacuum of 200 Pa (DIN 53887), particularly preferably between 500 and 1000 l/m$^2$.s under a vacuum of 200 Pa. Preferred diameters of the fibers of the fine fiber web are from 0.5 μm to 15 μm, particularly advantageously from 2 μm to 8 μm (method of determination: microscopy). In a particularly favorable embodiment, the fine fibered web is a melt-blown web.

The filter laminate/composite of the invention preferably has an air permeability of 45 to 460 l/m$^2$.s under a vacuum of 200 Pa (DIN 53887).

A specific embodiment of the filter laminate/composite comprises one ply of fine fibered web and one ply of filter paper.

To manufacture the laminate/composite of the invention with an-edge strip blank, the at least one ply of fine fiber web can be produced and laid down directly on a previously presented filter paper ply with the necessary edge blank. In this case the dividing of the continuous length of material and trimming to the final width required is carried out in a subsequent operation.

However, the filter laminate/composite can also be produced by previous fabrication of the at least one ply of fine fibered web in the necessary width, subsequently positioning of this ply on a ply of filter paper to produce the edge strip blank, and implementing lamination. The edge strip blanks, which depending on the width requirement of the bag types to be manufactured have to be produced in an appropriate number across the whole working width of the laminate/composite before roll cutting, and can be produced by stripwise cutting of the at least one ply of fine fibered web.

We claim:

1. A multi-ply filter laminate composite for manufacturing vacuum cleaner filter bags, said laminate composite comprising at least one ply of a filter paper and at least one ply of a fibrous filter web bonded to said filter paper, said at least one ply of fibrous filter web extending over the surface of said filter paper excepting a width along an edge of the ply of filter paper so as to form at least one edge strip blank on said at least one ply of filter paper.

2. A multi-ply filter laminate composite as claimed in claim 1, wherein said composite comprises a single ply of said filter paper and a single ply of said fibrous filter web.

3. A multi-play filter laminate composite as claimed in claim 1 or 2, wherein said laminate composite has an air permeability of from about 45 to 460 l/m$^2$.s under a vacuum of 200 Pa.

4. A multi-ply filter laminate composite as claimed in claim 1, wherein said at least one ply of filter paper has a weight from about 30 to 80 g/m$^2$.

5. A multi-ply filter laminate composite as claimed in claim 1, wherein said at least one ply of filter paper has an air permeability of from about 80 to 600 l/m$^2$.s under a vacuum of 200 Pa.

6. A multi-ply filter laminate composite as claimed in claim 1, wherein said at least one ply of filter paper has a breaking resistance in the longitudinal direction of from about 20 to 80 N/15 mm edge strip width and in the transverse direction of from about 15 to 60 N/15 mm edge strip width.

7. A multi-ply filter laminate composite as claimed in claim 1, wherein the at least one ply of fibrous filter web has a weight per unit area of from about 3 to 30 g/m$^2$.

8. A multi-ply filter laminate composite as claimed in claim 1, wherein the at least one ply of fibrous filter web has an air permeability of from about 100 to 2000 l/m$^2$.s under a vacuum of 200 Pa.

9. A multi-ply filter laminate composite as claimed in claim 1, wherein said at least one ply of fibrous filter web has an average fiber diameter within a range of from about 0.5 μm to 15 μm.

10. A multi-ply filter laminate composite as claimed in claim 1, wherein said at least one ply of fibrous filter web comprises a ply of a melt-blown web.

11. A multi-ply filter laminate composite as claimed in claim 1, wherein a plurality of said plies are bonded together by an adhesive agent.

12. A multi-ply filter laminate composite as claimed in claim 1, wherein a plurality of said plies are bonded together by hot calendering or ultrasonic welding.

13. A multi-ply filter laminate composite as claimed in claim 1, wherein the edges at the ends of the least one ply of fibrous filter web are bonded in an air-tight connection with a ply which is positioned therebeneath.

* * * * *